US009015427B2

(12) United States Patent
Rommelmann et al.

(10) Patent No.: US 9,015,427 B2
(45) Date of Patent: Apr. 21, 2015

(54) SYSTEMS AND METHODS FOR EMPLOYING AN ELECTRONICALLY-READABLE MONITORING MODULE ASSOCIATED WITH A CUSTOMER REPLACEABLE COMPONENT TO UPDATE A NON-VOLATILE MEMORY IN AN IMAGE FORMING DEVICE

(75) Inventors: Heiko Rommelmann, Penfield, NY (US); Alberto Rodriguez, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 370 days.

(21) Appl. No.: 13/620,530

(22) Filed: Sep. 14, 2012

(65) Prior Publication Data

US 2014/0082302 A1 Mar. 20, 2014

(51) Int. Cl.

| | |
|---|---|
| ***G06F 13/00*** | (2006.01) |
| ***G06F 13/28*** | (2006.01) |
| ***G03G 15/08*** | (2006.01) |
| ***G03G 21/18*** | (2006.01) |

(52) U.S. Cl.

CPC ........ *G03G 15/0863* (2013.01); *G03G 21/1889* (2013.01)

(58) Field of Classification Search

CPC ....................... G03G 15/0863; G03G 21/1889

See application file for complete search history.

(56) References Cited

U.S. PATENT DOCUMENTS

| | | | | |
|---|---|---|---|---|
| 6,351,621 | B1 | 2/2002 | Richards et al. | |
| 2003/0025939 | A1 * | 2/2003 | Jeran et al. | 358/1.16 |
| 2005/0182822 | A1 * | 8/2005 | Daniel et al. | 709/213 |

* cited by examiner

*Primary Examiner* — Eric S Cardwell

(74) *Attorney, Agent, or Firm* — Ronald E. Prass, Jr.; Prass LLP

(57) ABSTRACT

A system and method are provided for updating a non-volatile memory (NVM) in an image forming device by employing the programmability of an electronically readable/writable memory module such as a customer replaceable unit monitor (CRUM) associated with a customer replaceable unit (CRU) as a vehicle for completing the needed updates in NVM values at the time of replacement of the CRU. Replacement of the CRU, where such replacement is verified by return of an expended CRU to the manufacturer, provides confirmation of updates to the NVM values. The CRUM provides a secure means to change image output terminal (IOT) set points and CRU related values stored in NVM locations that otherwise would require a manufacturers' customer service personnel visit to update. By providing an NVM location (chain/link), the value to be used and a one-time use authentication string, an automated update to the NVM is performed in a secure manner.

19 Claims, 3 Drawing Sheets

SYSTEMS AND METHODS FOR EMPLOYING AN ELECTRONICALLY-READABLE MONITORING MODULE ASSOCIATED WITH A CUSTOMER REPLACEABLE COMPONENT TO UPDATE A NON-VOLATILE MEMORY IN AN IMAGE FORMING DEVICE

BACKGROUND

1. Field of the Disclosed Embodiments

This disclosure relates to systems and methods for employing electronically-readable/writable monitoring modules associated with customer replaceable components or units (CRUs) as a vehicle by which to update non-volatile memories (NVMs) in customer owned and/or controlled image forming devices.

2. Related Art

All manner of image forming devices use consumable products, such as inks and toners, and otherwise include customer replaceable components or units (CRUs), many of which are routinely replaceable based on a limited service life. In the latter instance, the service life of a particular CRU may be tracked and measured, for example, according to a number of image forming operations that the CRU may undertake. For the purposes of this disclosure, the terms of CRU and consumable may be used interchangeably.

Image forming devices make extensive beneficial use of a capacity to externally monitor the status of the one or more CRUs in the image forming devices. The monitoring of the CRUs is often implemented by way of an electronically-readable module associated with the CRU for monitoring one or more characteristics of the CRU. The monitored characteristics can include static information, i.e., information that does not change over the usable service life of the CRU, such as a model or serial number and/or compatibility of the CRU with the image forming device within which the CRU is installed. The monitoring module can also be used to record, in an electronically-readable format, dynamically changing information relating to a particular characteristic of the CRU. Such dynamic information may include, for example, information on use, maintenance, failures, diagnostics, remanufacture, remaining service life or remaining consumable level(s), among other characteristics of the customer replaceable component.

Outputs from these monitoring modules are received locally by circuitry in the image forming devices that is designed to read from and write to the monitoring modules. A user may be presented with information regarding the outputs from these monitoring modules at the image forming device via some manner of graphical user interface (GUI) associated with the image forming device within which the CRU is installed.

U.S. Pat. No. 6,351,621 to Richards et al., which is commonly assigned and the disclosure of which is incorporated herein by reference in its entirety, discloses CRUs that are augmented with electronically-readable/writable monitoring chips containing static information for identification of the CRU, and/or dynamic information relating to an operating status of the CRU. Richards refers to such electronically-readable/writable monitoring chips as customer replaceable unit monitors or CRUMs.

Richards explains that, when an individual CRU is installed in an image forming device, communication is established with the CRUM located within, or externally mounted to, the individual CRU. The CRUM enables the image forming device to track one or more characteristics of the CRU by reading data from, and potentially updating the information contained by writing data to, the CRUM.

SUMMARY OF THE DISCLOSED EMBODIMENTS

Since Richards was patented, the information contained in CRUMs has been expanded to support a number of additional beneficial functions. CRUMs are widely employed in efforts to curtail the use of "gray" market components by providing necessary compatibility information that the image forming device must read from the CRUM regarding a replacement CRU before it will proceed with further image forming operations after the installation of the replacement CRU. In this manner, the CRUM can be used to address issues of fraud and security with regard to specified CRUs in image forming devices. Specifically, the CRUM provides a vehicle by which the CRU is made to communicate to the image forming device within which the CRU is installed to provide compatibility information to tell the image forming device that a replacement CRU is an authorized or compatible CRU provided by the manufacturer of the image forming device, e.g., a device manufacturer proprietary device rather than a copy or counterfeit device.

Capabilities associated with particular image forming devices tend to advance significantly over the lifecycles of the image forming devices even as CRUs are routinely replaced at intervals over those lifecycles. At the time of launch of particular image forming devices, many values/parameters related to consumables behavior and/or performance as those capabilities exist at that particular time are loaded in NVMs during a process of pre-delivery firmware upload for the particular image forming devices. Some of these parameters are based on the consumables characteristics and/or marketing strategies at the time of product launch. Some of these parameters may be used by the image forming devices to control device behavior and to maximize CRU performance.

After product launch, during domestication of the consumables for example, some of the previously-loaded parameters may change. As these parameters change, certain of the initially-programmed NVM values need to be altered in order to enable the domesticated CRUs to perform correctly and to maximize their performance. Conventionally, because the need to update NVM values occurs at some time after product launch when a particular image forming device is fielded for customer use, and under customer control, changing the necessary NVM values generally requires a visit from manufacturers' customer service personnel to provide, for example, program updates to particular image forming devices. Verification of the installation of the program updates by the manufacturers' customer service personnel provides positive feedback that the changes to the NVM values have, in fact, been made.

It would be advantageous to avoid the requirement to dispatch manufacturers' customer service personnel to change the necessary NVM values while maintaining some positive control scheme by which to confirm, or otherwise verify, that the NVM values have been changed in customer-owned and/or customer controlled image forming devices.

Exemplary embodiments of the systems and methods according this disclosure may provide such an NVM value update capability by employing the programmability of a CRUM as a vehicle for completing the needed updates in NVM values at the time of replacement of the CRU with which the CRUM is associated.

In exemplary embodiments, replacement of the CRU, particularly in instances where the replacement is verified by return of an expended CRU to the manufacturer, may provide confirmation that the updates to the NVM values have been implemented.

Exemplary embodiments may provide an NVM location such as, for example, a chain and/or link number, along with a variable value and an authentication signature in the CRUM memory. When the image forming device reads the CRUM upon installation of the replacement CRU with which the CRUM is associated, the image forming device may know to authenticate with the CRUM, and upon successful authentication, may allow the specified NVM value to be changed to the new NVM value that is stored in the CRUM.

Exemplary embodiments may employ the CRUM as a secure means to change image output terminal (IOT) set points and CRU related values stored in NVM locations that otherwise would require a manufacturers' customer service personnel visit to update.

In exemplary embodiments, by providing the NVM location (chain/link), the value to be used and a one-time use authentication string, an automated update to the NVM could be performed in a secure manner.

Exemplary embodiments may provide positive feedback that the NVM update has occurred by marking the CRUM appropriately to indicate that the update has been completed in a particular image forming device in which the CRU with which the CRUM is associated is installed. For example, the IOT firmware may be enabled to increment a revision number to indicate and trace the changes made by the CRUM update or to provide the IOT firmware with the necessary information to generate a new version number.

Exemplary embodiments may provide that, as CRUs are, for example, returned to the manufacturer for reconditioning, remanufacturing or disposal, the data of the CRUM can provide information that can be used to report, track, or otherwise evaluate, the success of the NVM updates in the image forming device in which the CRU was expended.

Exemplary embodiments may provide a manner by which the CRUM data, in conjunction with the call center data and/or remanufacturing site tracking data, may be used to determine that a particular update was effective in addressing a particular operational, or customer behavior, issue at which the update was targeted.

Exemplary embodiments may employ existing CRUM technology in a novel manner to change NVM values that would otherwise require site visits by manufacturers' customer service personnel to accomplish the update and to provide positive verification that the action was taken.

Exemplary embodiments may prompt IOT firmware revision number rolls to trace changes made to the individual image forming device NVMs for configuration control and tracking.

Exemplary embodiments may result in realization of significant savings by reducing instances of required site visits by manufacturers' customer service personnel while substantially guaranteeing that a particular family of customer owned and/or customer controlled image forming devices are updated with appropriate new NVM values. Flexibility may be enhanced in providing a capability by which inventory purges may no longer be required to remove, for example, "old" CRUs that otherwise may have been rendered obsolete absent an ability to cost-effectively update NVM values to support the CRUs. Traceability of changes and data to aid in determining data driven assessments of update success may be additional benefits of the disclosed systems and methods.

These and other features, and advantages, of the disclosed systems and methods are described in, or apparent from, the following detailed description of various exemplary embodiments.

BRIEF DESCRIPTION OF THE DRAWINGS

Various exemplary embodiments of the disclosed systems and methods for employing electronically-readable/writable monitoring modules associated with customer replaceable components or units (CRUs) as a vehicle by which to update non-volatile memories in customer owned and/or customer controlled image forming devices, will be described, in detail, with reference to the following drawings, in which.

DETAILED DESCRIPTION OF THE DISCLOSED EMBODIMENTS

The systems and methods for employing electronically-readable/writable monitoring modules, such as CRUMs associated with CRUs, as vehicles by which to update NVMs in customer owned and/or customer controlled image forming devices according to this disclosure will generally refer to this specific utility for those systems and methods. Exemplary embodiments described and depicted in this disclosure should not be interpreted as being specifically limited to any particular configuration of an image forming device, CRU or CRUM, or limited to only that particular intended use. In fact, any advantageous use of an electronically-readable/writable component monitoring module associated with a replaceable consumable component in any fielded processor-controlled system or device that may benefit from use of the module as a verifiable vehicle for updating preset processing conditions and/or values for use in the processor controlling the fielded system or device using methods discussed in this disclosure is contemplated.

Specific reference to, for example, any particular image forming device, including but not limited to any of a printer, copier, scanner, facsimile machine or multi-function device, particularly those including toner-based image forming and/or fusing modules, should be understood as being exemplary only, and not limiting, in any manner, to any particular class of such devices. The systems and methods according to this disclosure will be described as being particularly adaptable to use in printing and/or copying devices such as, for example, xerographic image forming devices for printing and/or copying that employ various CRUs for facilitating forming and fusing toner images on image receiving media substrates, but should not be considered as being limited to only these types of devices. Any commonly known processor-controlled image forming device in which the processor references stored operating parameters and values for controlling the image forming operations in the image forming device that may be adapted according to the specific capabilities discussed in this disclosure is contemplated.

Figure 1:
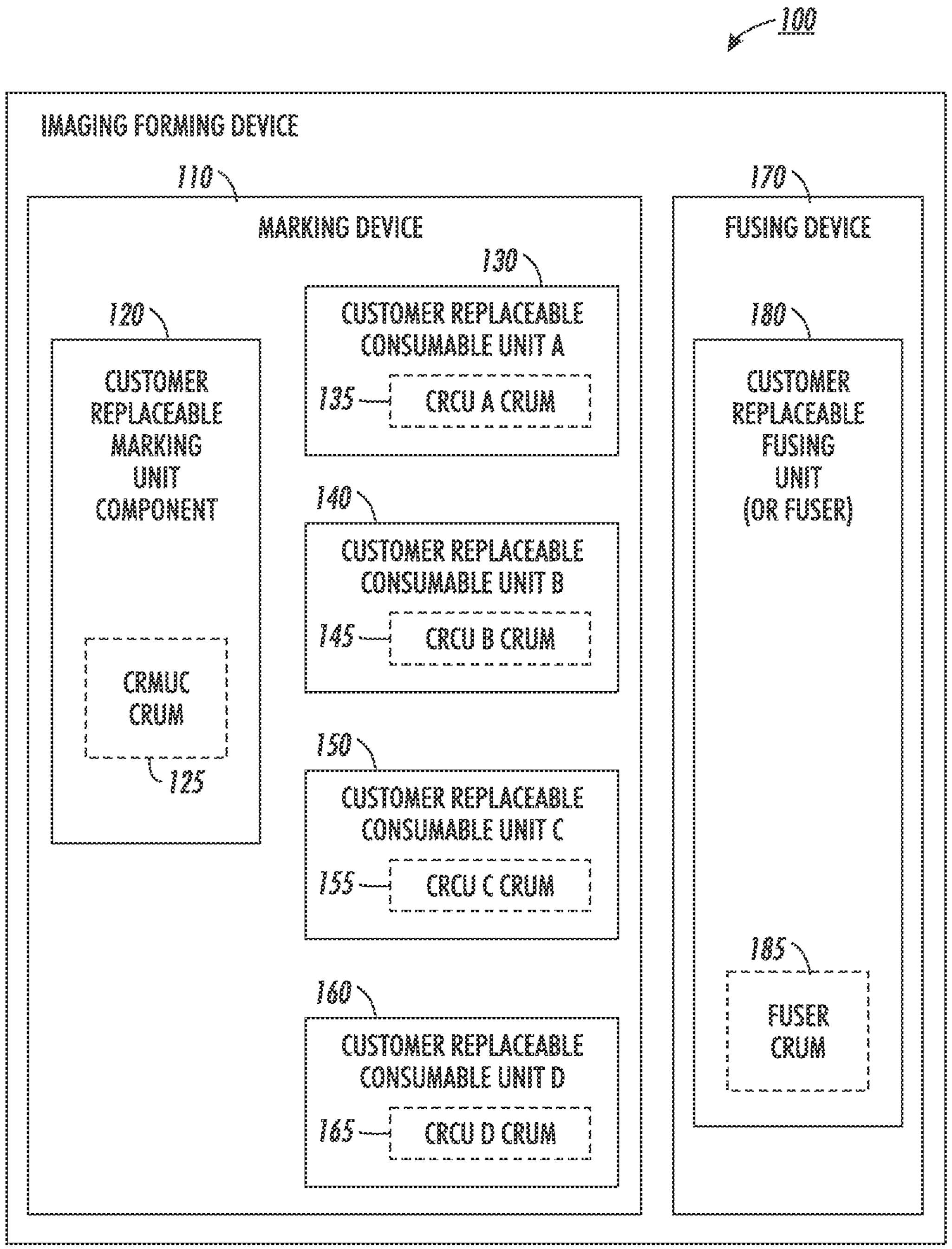
FIG. 1 illustrates a simplified schematic diagram of an exemplary image forming device implementing a CRUM-based communication scheme between a plurality of CRUs and the image forming device.

FIG. 1 illustrates a simplified schematic diagram of an exemplary image forming device 100 implementing a CRUM-based communication scheme between a plurality of CRUs and the image forming device. As shown in FIG. 1, the exemplary image forming device 100 may include at least one marking device 110 for marking an image receiving medium substrate with image marking material and at least one fusing device 170 for fusing the image marking material onto the image receiving medium substrate to fix an image thereon.

The at least one marking device 110 may include at least customer replaceable marking unit component 120. The customer replaceable marking unit component 120 may be, for example, a photoreceptor drum, or belt, or other like device that may have a limited service life, which is intended to be replaced by the customer with a replacement authorized and compatible component supplied by the image forming device manufacturer at an end of the service life for the component. The end of service life may be, for example, after a predetermined number of image forming cycles. The customer replaceable marking unit component (CRMUC) 120 may include a CRMUC monitoring module (CRMUC CRUM) 125. The CRMUC CRUM 125 may include static and dynamic information, as discussed above, which is communicated to, received from, or otherwise exchanged with information exchange components (see FIG. 2) in the image forming device. The information exchange scheme between the image forming device and the CRMUC CRUM 125, and other CRUMs depicted and described in this disclosure, will be according to known methods, such as those described in Richards, and will not be further described except as specifically indicated with reference to FIG. 2 below regarding information exchange between a CRUM and an NVM for NVM value update and confirmation.

The at least one marking device 110 may include a plurality of customer replaceable consumable units A-D 130,140,150,160. The plurality of customer replaceable consumable units A-D 130,140,150,160 may be, for example, a plurality of toner receptacles or bottles storing different colors of toner material. The utility of each of the plurality of customer replaceable consumable units A-D 130,140,150,160 may be measured according to the expenditure of the individually-colored toner in each toner bottle. Once the consumable in each of the plurality of customer replaceable consumable units A-D 130,140,150,160 is expended, each of the plurality of customer replaceable consumable units A-D 130,140,150,160 is intended to be replaced by the customer with a replacement authorized and compatible consumable unit supplied by the image forming device manufacturer. The plurality of customer replaceable consumable units (CRCUs) A-D 130,140,150,160 may include a plurality of respective CRCU A-D monitoring modules (CRCU A-D CRUMs) 135,145,155,165. The CRCU CRUMs 135,145,155,165 may include static and dynamic information, as discussed above, which is communicated to, received from, or otherwise exchanged with the information exchange components in the image forming device. Specifically, the information exchange scheme may be used to monitor a current level, and/or pending exhaustion, of a particular consumable in one or more of the plurality of customer replaceable consumable units A-D 130,140,150,160.

The at least one fusing device 170 may include at least one customer replaceable fusing unit (or fuser) 180. The fuser 180 may be, for example, a roller or like device that includes heater elements to which a voltage is applied by the image forming device 100 to heat the fuser 180, and temperature sensors to provide feedback to control the heating of the fuser 180, according to a specific profile, to operating temperatures within a specified operating temperature range. Like the customer replaceable marking unit component 120, the fuser 180 may have a limited service life according to, for example, a number of heating cycles to which the fuser 180 is subjected. The fuser 180 is also intended to be replaced by the customer with a replacement authorized and compatible fuser supplied by the image forming device manufacturer at an end of the service life for the fuser 180. The fuser 180 may include a fuser monitoring module (fuser CRUM) 185. The fuser CRUM 185 may include static and dynamic information, as discussed above that is communicated to, received from, or exchanged with information exchange components in the image forming device.

FIG. 1 thus shows examples of the many CRUs that may be included in a typical image forming device, any or each of which may include a CRUM to facilitate information exchange to the image forming device. Conventionally, this information exchange has been limited to that necessary and appropriate to facilitate and monitor operation of the CRU with which a particular CRUM is associated in the image forming device according to pre-programmed schemes and values stored in an NVM of the image forming device.

This disclosure is directed to programming CRUMs, at a point of manufacture or supply, before the CRUs are dispatched to customer sites for customer replacement of the CRUs in the image forming devices, with specific message strings in the CRUM to indicate to the image forming device that the CRUM is programmed with an update for an NVM in the image forming device. An information exchange between the image forming device, specifically with the NVM, and the CRUM may determine whether a particularly-identified update has been effected in the NVM. If a determination is made that the particularly-identified update has not been made, an authentication scheme may be undertaken between the NVM and CRUM to confirm, for example, that the proposed update is genuine, authorized and/or provided by the image forming device manufacturer. In this manner, systems of checks and balances may be provided to ensure that unauthorized updates are not made thereby potentially corrupting the NVM, and that authorized updates are not repeatedly made to any values stored in the NVM. Once system confirmation is achieved to indicate that the particularly-identified update has not yet been previously effected in the NVM, and that the particularly-identified update is authorized by the image forming device manufacturer, information exchange between the CRUM and the NVM may effect a change in NVM values in specifically identified storage locations in the NVM that are assigned for storing those values. Upon completion of the NVM value update in the image forming device, an information exchange feedback scheme may be executed to pass data from the NVM to the CRUM to then confirm that the NVM value updates have been received and implemented. This ability to write confirmation information to the CRUM may provide an appropriate level of positive verification and confirmation to the image forming device manufacturer when the CRU containing the CRUM is ultimately returned to the image forming device manufacturer and the image forming device manufacturer reads information from the CRUM, for example, which may associate a specific revision number for an NVM update with a serial number for an image forming device that used the expended CRU. With full implementation in this manner, a level of inventory management and configuration control may thus be positively provided to the image forming device manufacturer as that image forming device manufacturer maintains, for example, a database of information regarding completion of updates in particular classes or families of fielded image forming devices. Such a database may be updated based on information regarding implementation of updates verified by reading the CRUMS in the returned CRUs. This positive control over inventory does not rely on, for example, customers reporting a status of an update to the image forming device manufacturer, or otherwise any requirement for the manufacturers' customer service personnel visiting each individual image forming device and verifying a status of a software update.

At some point during a lifecycle of the image forming device, in fact at routine intervals throughout the lifecycle of the device, CRU replacement will be required. The disclosed schemes advantageously piggyback onto this requirement a capacity incumbent to CRU replacement in particular image forming devices to provide NVM value updates. In this manner, the updates will necessarily occur in a verifiable manner without additional interaction by the image forming device manufacturer with the customer or the customer owned and/or customer controlled image forming devices in a manner that may be essentially transparent to the customer.

These schemes may prove particularly beneficial in at least two exemplary commonly-encountered operating scenarios.

First, the use of new or different materials during CRU domestication sometimes requires the IOT to behave differently. For example, a new photoreceptor drum design may be used in an imaging unit in a xerographic image forming device based on some operational or cost advantage. A newly-designed drum, however, may require different parameters (coefficients) for required wear rate calculations. For most IOTs, all or some of these values may be placed in NVM locations that currently only the manufacturers' customer service personnel may be able to access through on-site diagnostic procedures. It is easy to understand that such values should be "protected" from being modified by the customer or end-user in order to maintain fidelity of the image forming process in the image forming device. It would be beneficial to provide a manufacturer-initiated capability by which to modify NVM values in a manner that is verifiable in this circumstance to attempt to maintain configuration control across a family of IOTs, without the need to dispatch manufacturers' customer service personnel.

Second, there are going to be instances when market and/or customer usage behaviors with regard to a particular family of image forming devices change. During product design and up to launch, certain assumptions are made that may determine market segmentation, for example. Assumptions are also made in terms of how the customer will use the product. After launch, it may be determined that customer behavior differs from what was assumed. As an example, CRUs from a given class of devices may be observed by the device manufacturer as being returned too early, or under unforeseen circumstances. These unexpected returns may trace back to any one of a number of circumstances that may affect customer behavior. One such circumstance may involve instances where a particular message may be presented to a customer or end-user via a graphical user interface associated with a particular image forming device. The message may be prompted by a predetermined threshold value for a CRU being reached. The manufacturer may have intended for the message to be simply advisory for the customer or end-user, i.e. "for information only." In response, however, customers or end-users may be found to evaluate the message as requiring some action such as replacing the CRU. This unintended customer behavior of prematurely replacing CRUs in response to advisory messages may be modified by changing the predetermined threshold value for the CRU at which the message may be displayed. It would be beneficial to provide a manufacturer-initiated capability by which to modify NVM values in a manner that is verifiable in this circumstance to achieve the intended outcome, that may preclude unnecessarily premature CRU replacement, without the need to dispatch manufacturers' customer service personnel to facilitate the value change.

The disclosed schemes by which NVM values may be updated in families of image forming devices may prove much more cost-effective than sending manufacturers' customer support personnel to service each image forming device in a fielded family of image forming devices. These schemes, as mentioned above, may also be largely transparent to participating customers. Additionally, customers who may choose not to participate, i.e., those customers that may choose to replace their CRUs with "gray" market components, will not receive necessary and appropriate software updates thereby potentially negatively affecting operations of, and/or the quality of image forming operations in, their non-updated image forming devices. This latter circumstance may result in at least a percentage of those non-participating customers abandoning the use of "gray" market components in favor of manufacturer-supplied CRUs in an effort to maintain the fidelity of operations and/or image quality in their image forming devices.

Figure 2:
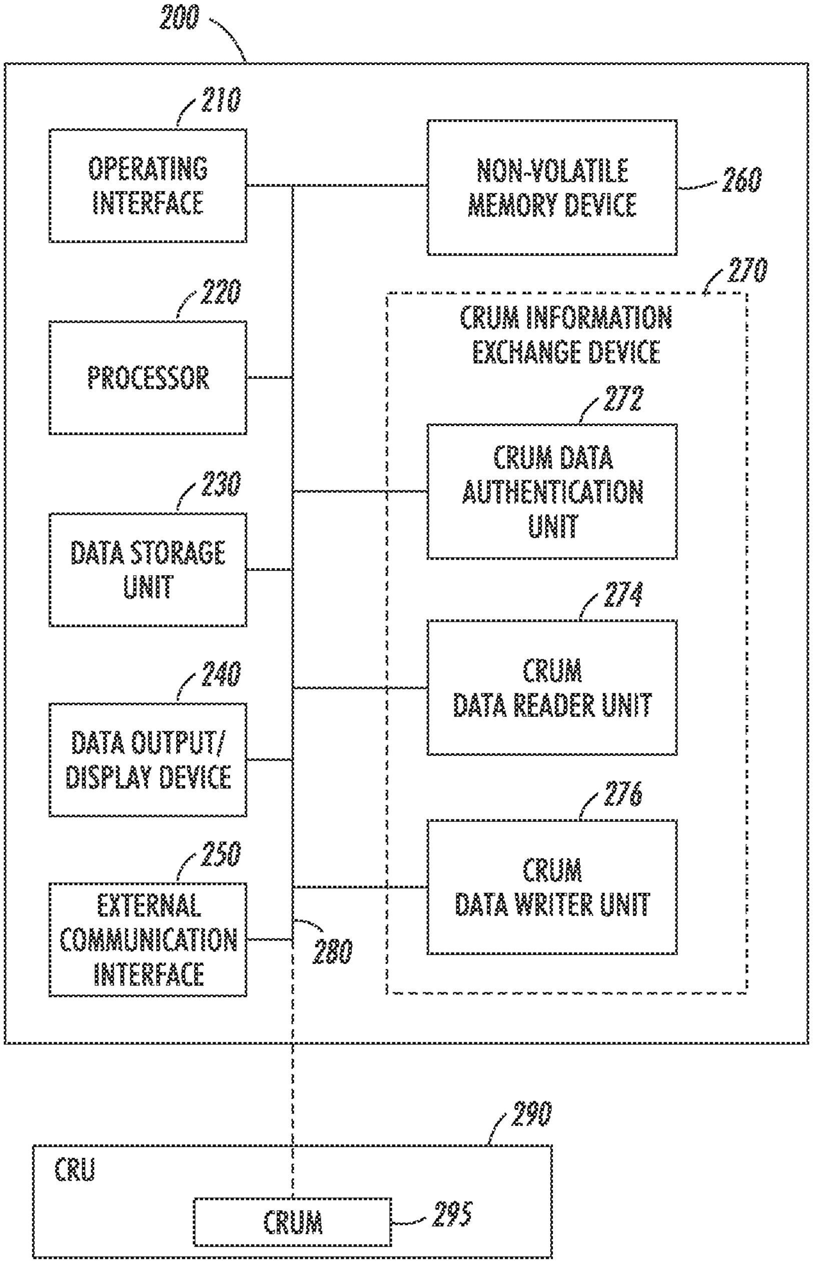
FIG. 2 illustrates a block diagram of an exemplary information exchange system in, or associated with, an image forming device including modules for facilitating information exchange with one or more CRUMs associated with CRUs in the image forming device according to this disclosure.

FIG. 2 illustrates a block diagram of an exemplary information exchange system 200 in, or associated with, an image forming device including modules for facilitating information exchange with one or more CRUMs associated with CRUs in the image forming device according to this disclosure.

The exemplary information exchange system 200 may include an operating interface 210 by which a user may communicate with the exemplary information exchange system 200. The operating interface 210 may be a locally accessible user interface associated with the image forming device. The operating interface 210 may be configured as one or more conventional mechanisms common to image forming devices and/or computing devices that may permit a user to input information to the exemplary information exchange system 200. The operating interface 210 may include, for example, a conventional keyboard, a touchscreen with "soft" buttons or with various components for use with a compatible stylus, a microphone by which a user may provide oral commands to the exemplary information exchange system 200 to be "translated" by a voice recognition program, or other like device by which a user may communicate specific operating instructions to the exemplary information exchange system 200. The operating interface 210 may also be a part of a function of a graphical user interface (GUI) mounted on, integral to, or associated with, the image forming device with which the exemplary information exchange system 200 is associated.

The exemplary information exchange system 200 may include one or more local processors 220 for individually operating the exemplary information exchange system 200 and for carrying out operating functions of the image forming device, including executing an information exchange protocol between information exchange components of the exemplary information exchange system 200 and the one or more CRUMs associated with CRUs in the image forming device. Processor(s) 220 may include at least one conventional processor or microprocessor that interprets and executes instructions to direct specific functioning of the exemplary information exchange system 200.

The exemplary information exchange system 200 may include one or more data storage devices 230. Such data storage device(s) 230 may be used to store data or operating programs to be used by the exemplary information exchange system 200, and specifically the processor(s) 220. Data storage device(s) 230 may be used to collect information regarding a status of NVM values stored in at least one of the data storage device(s) 230 that may comprise an NVM for the image forming device, or in a separate NVM 260 for the image forming device. The data storage device(s) 230 may include a random access memory (RAM) or another type of dynamic storage device that is capable of storing updatable database information, and for separately storing instructions for execution of system operations by, for example, processor(s) 220. Data storage device(s) 230 may also include a read-only memory (ROM), which may include a conventional ROM device or another type of static storage device that stores static information and instructions for processor(s) 220. Further, the data storage device(s) 230 may be integral to the exemplary information exchange system 200, or may be provided external to, and in wired or wireless communication with, the exemplary information exchange system 200.

The exemplary information exchange system 200 may include at least one data output device 240, which may be configured as one or more conventional mechanisms that output information to a user, including a display screen on a GUI of the image forming device or on a separate computing device in wired or wireless communication with the image forming device.

The exemplary information exchange system 200 may include one or more separate external data interfaces 250 by which the exemplary information exchange system 200 may communicate with components external to the exemplary information exchange system 200. At least one of the external data interfaces 250 may be configured as an output port for connection to, for example, a separate printer, a copier, a scanner, a multi-function device, or a remote storage medium, such as a digital memory in any form. Any suitable data connection in wired or wireless communication with an external data repository or external data storage device is contemplated to be encompassed by the depicted external data interface 250.

The exemplary information exchange system 200 may include a dedicated NVM 260 as mentioned above with regard to the data storage device(s) 230.

The exemplary information exchange system 200 may include a CRUM information exchange device 270 as a part of a processor 220 coupled to, for example, one or more storage devices 230, or as a separate stand-alone component module or circuit in the exemplary information exchange system 200. The CRUM information exchange device 270 may include at least a CRUM data authentication unit 272, a CRUM data reader unit 274 and a CRUM data writer unit 276. Via these separate units, the CRUM information exchange device 270 of the exemplary information exchange system 200 may execute information exchange between the image forming device with which the exemplary information exchange system 200 is associated and individual CRUMs 295 associated with one or more CRUs 290 in the image forming device.

The CRUM data authentication unit 272 may be used to execute the data authentication scheme between the exemplary information exchange system 200 and one or more individual CRUMs 295 to verify that any data or information stored on the CRUM 295 is genuine. Such a capability for the CRUM information exchange device 270, via the CRUM data authentication unit 272, to verify the fidelity of data or information stored on the CRUM 295 may be particularly beneficial in executing disclosed schemes that will copy updated NVM values from the CRUM 295 to replace values already stored in the NVM 260 for the image forming device. It can be easily appreciated that copying non-genuine replacement values from the CRUM 295 to the NVM 260 may result in corrupting the values stored in the NVM 260 to a point that may render the image forming device inoperative, thereby requiring the site visit from the manufacturers' customer service personnel that the disclosed schemes are intended to avoid.

The CRUM data reader unit 274 may be used to read data from the CRUM 295 while the CRUM data writer unit 276 may be used to write data to the CRUM 295 according to known methods and in support of the disclosed information exchange schemes.

All of the various components of the exemplary information exchange system 200, as depicted in FIG. 2, may be connected internally, and to one or more CRUMs 295 associated with one or more CRUs 290 by one or more data/control busses 280. These data/control busses 280 may provide wired or wireless communication between the various components of the exemplary information exchange system 200, whether all of those components are housed integrally in, or are otherwise external and connected to an image forming device with which the exemplary information exchange system 200 may be associated. It should be recognized that at least the CRUMs 295 associated with the CRUs 290, as depicted in FIG. 2, are intended to establish wired or wireless communication once the CRUs 290 are installed in the image forming device to complete the exemplary information exchange system 200, as depicted.

It should be appreciated that, although depicted in FIG. 2 as an integral unit, the various disclosed elements of the exemplary information exchange system 200 may be arranged in any combination of sub-systems as individual components or combinations of components, integral to a single unit, or external to, and in wired or wireless communication with the single unit of the exemplary information exchange system 200. In other words, no specific configuration as an integral unit or as a support unit is to be implied by the depiction in FIG. 2. Further, although depicted as individual units for ease of understanding of the details provided in this disclosure regarding the exemplary information exchange system 200, it should be understood that the described functions of any of the individually-depicted components may be undertaken, for example, by one or more processors 220 connected to, and in communication with, one or more data storage device(s) 230, at least one of the data storage device(s) 230 acting as an NVM for the image forming device.

Figure 3:
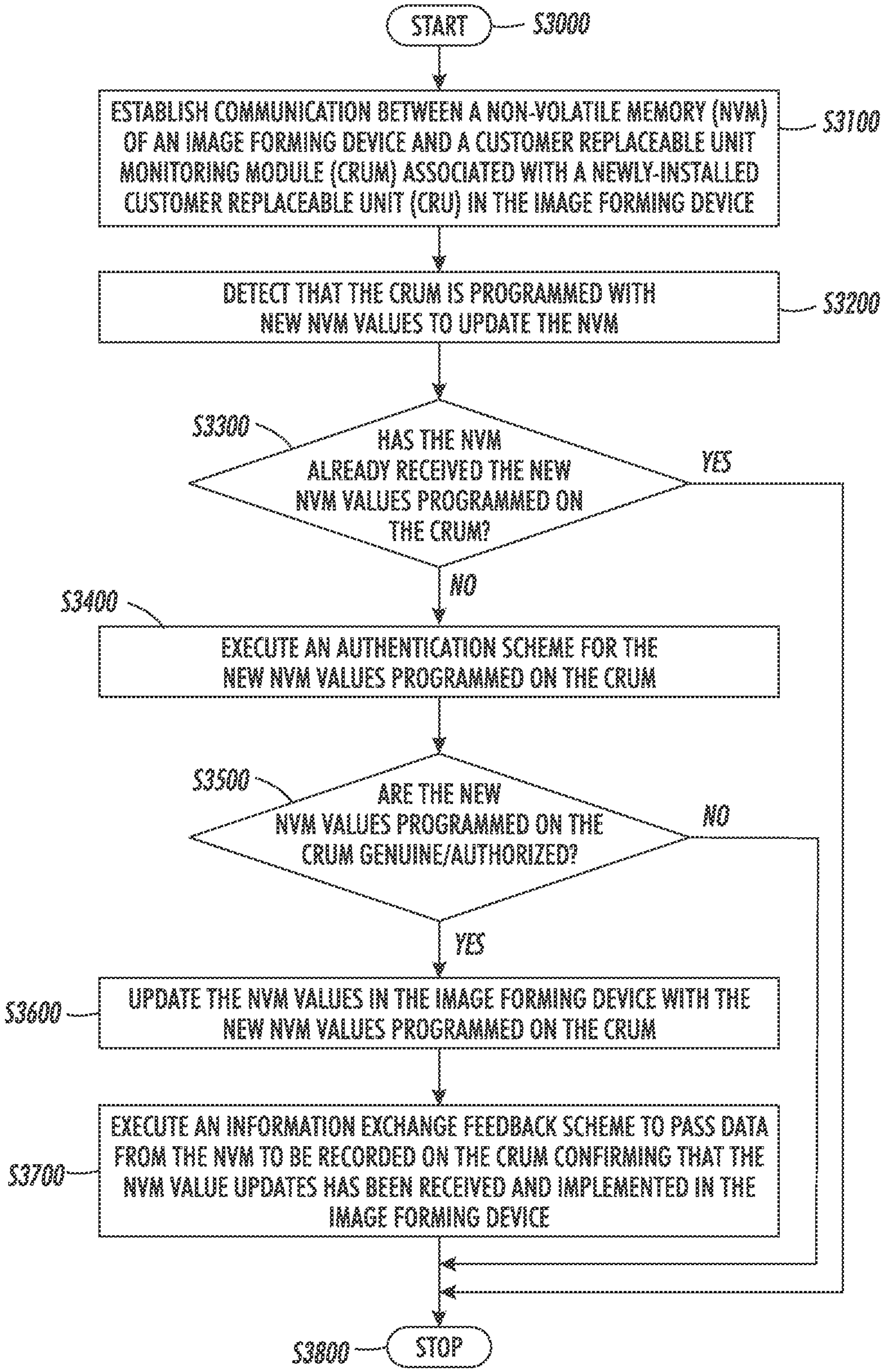
FIG. 3 illustrates a flowchart of an exemplary method for employing a CRUM as a vehicle by which to update non-volatile memories in customer owned and/or customer controlled image forming devices according to this disclosure.

The disclosed embodiments may include a method for employing a CRUM as a vehicle by which to update NVMs in customer owned and/or customer controlled image forming devices according to this disclosure. FIG. 3 illustrates a flowchart of such an exemplary method. As shown in FIG. 3, operation of the method commences at Step S3000 and proceeds to Step S3100.

In Step S3100, the image forming device may detect a newly-installed CRU. This step may prevent a need to monitor new NVM value information that may be stored on a CRUM associated with the CRU every time that the image forming device is turned on or prior to every image forming operation. The information exchange components in the image forming device, communication may be established between an NVM for the image forming device and the CRUM. Operation of the method proceeds to Step S3200.

In Step S3200, the image forming device may detect that the CRUM has stored on it data regarding new NVM values by which to update certain values already stored in the NVM for the image forming device. Operation of the method proceeds to Step S3300.

Step S3300 is a determination step in which an information exchange between the image forming device, specifically with the NVM, and the CRUM may determine whether a particularly-identified update to the NVM values has already been effected in the NVM for this image forming device.

If, in Step S3300, a determination is made that the particularly-identified update to the NVM values has been made, operation of the method proceeds to Step S3800, where operation the method ceases.

If, in Step S3300, a determination is made that the particularly-identified update to the NVM values has not been made, operation of the method proceeds to Step S3400.

In Step S3400, an authentication scheme may be undertaken between the NVM and CRUM to confirm, for example, that proposed new NVM values that are to be substituted for values previously stored in the NVM for the image forming device are genuine, authorized and/or provided by the image forming device manufacturer. In this manner, systems of checks and balances may be provided to ensure that unauthorized updates are not made thereby potentially corrupting the NVM, and that authorized updates are not repeatedly made to any values stored in the NVM. Operation of the method proceeds to Step S3500.

Step S3500 is a determination step in which a result of the authentication scheme is reviewed to determine that the new NVM values stored on the CRUM are genuine, authorized and/or provided by the image forming device manufacturer.

If, in Step S3500, a determination is made that the new NVM values stored on the CRUM are not genuine, authorized and/or provided by the image forming device manufacturer, operation of the method proceeds to Step S3800, where operation the method ceases.

If, in Step S3500, a determination is made that the new NVM values stored on the CRUM are genuine, authorized and/or provided by the image forming device manufacturer, operation of the method proceeds to Step S3600.

In Step S3600, having determined that the particularly-identified new NVM values for update of the NVM in the image forming device have not yet been previously stored in the NVM, and that the particularly-identified new NVM values for update of the NVM in the image forming device are genuine and/or authorized by the image forming device manufacturer, information exchange between the CRUM and the NVM may effect a change in NVM values in specifically identified storage locations in the NVM that are assigned for storing those values. Operation of the method proceeds to Step S3700.

In Step S3700, upon completion of the NVM value update in the image forming device, an information exchange feedback scheme may be executed to pass data from the NVM to the CRUM to then confirm that the NVM value updates have been received and implemented. This ability to write confirmation information to the CRUM may provide an appropriate level of positive verification and confirmation to the image forming device manufacturer when the CRU containing the CRUM is ultimately returned to the image forming device manufacturer and the image forming device manufacturer reads information from the CRUM, for example, which may associate a specific revision number for an NVM update with a serial number for an image forming device that used the expended CRU. Operation of the method proceeds to Step S3800, where operation of the method ceases.

As indicated above, the method may positively provide a level of inventory management and configuration control to the image forming device manufacturer as that image forming device manufacturer maintains, for example, a database of information regarding completion of software updates in particular classes or families of fielded image forming devices. Such a database may be updated based on information regarding implementation of software updates verified by reading the CRUMS in expended CRUs when those expended CRUs are returned to the manufacturer.

The disclosed embodiments may include a non-transitory computer-readable medium storing instructions which, when executed by a processor, may cause the processor to execute all, or at least some, of the steps of the method outlined above.

The above-described exemplary systems and methods reference certain conventional components to provide a brief, general description of suitable operating and image processing environments in which the subject matter of this disclosure may be implemented for familiarity and ease of understanding. Although not required, embodiments of the disclosure may be provided, at least in part, in a form of hardware circuits, firmware, or software computer-executable instructions to carry out the specific functions described. These may include individual program modules executed by a processor. Generally, program modules include routine programs, objects, components, data structures, and the like that perform particular tasks or implement particular data types in support of the overall objective of the systems and methods according to this disclosure.

Those skilled in the art will appreciate that other embodiments of the disclosed subject matter may be practiced in image forming devices and other customer-controlled machinery and systems that may include CRUs of many different configurations. Embodiments according to this disclosure may be practiced in distributed computing environments where tasks are performed by local and remote devices that may, for example, remotely direct image forming operations in a particular image forming device and receive messages regarding the progress of the directed image forming operations or the status of one or more CRUs based on information read from individual CRUMs associated with those CRUs. Remotely-located devices and components may be linked to each other by hardwired links, wireless links, or a combination of both through a communication network. In a distributed computing environment, program modules may be located in both local and remote memory storage devices.

As indicated above, embodiments within the scope of this disclosure may also include computer-readable media having stored computer-executable instructions or data structures that can be accessed, read and executed by one or more processors. Such computer-readable media can be any available media that can be accessed by a processor, general purpose or special purpose computer. By way of example, and not limitation, such computer-readable media can comprise RAM, ROM, EEPROM, CD-ROM, flash drives, data memory cards or other analog or digital data storage device that can be used to carry or store desired program elements or steps in the form of accessible computer-executable instructions or data structures. When information is transferred or provided over a network or another communications connection, whether wired, wireless, or in some combination of the two, the receiving processor properly views the connection as a computer-readable medium. Thus, any such connection is properly termed a computer-readable medium. Combinations of the above should also be included within the scope of the computer-readable media for the purposes of this disclosure.

Computer-executable instructions include, for example, non-transitory instructions and data that can be executed and accessed respectively to cause a processor to perform certain of the above-specified functions, individually or in various combinations. Computer-executable instructions may also include program modules that are remotely stored for access and execution by a processor.

The exemplary depicted sequence of executable instructions or associated data structures represents one example of a corresponding sequence of acts for implementing the functions described in the steps of the above-outlined exemplary method. The exemplary depicted steps may be executed in any reasonable order to effect the objectives of the disclosed embodiments. No particular order to the disclosed steps of the method is necessarily implied by the depiction in FIG. 3, except where a particular method step is a necessary precondition to execution of any other method step.

Although the above description may contain specific details, they should not be construed as limiting the claims in any way. Other configurations of the described embodiments of the disclosed systems and methods are part of the scope of this disclosure.

It will be appreciated that various of the above-disclosed and other features and functions, or alternatives thereof, may be desirably combined into many other different systems or applications. Also, various alternatives, modifications, variations or improvements therein may be subsequently made by those skilled in the art which are also intended to be encompassed by the following claims.

We claim:

1. A method of updating a memory device in an operating system, comprising:

establishing data communication between the memory device in the operating system and a data exchange module on a customer replaceable component when the customer replaceable component is installed in the operating system;

detecting, with a processor, new value data programed into the data exchange module for updating the memory device;

determining, with the processor, that the memory device has not been updated with the new value data;

updating the memory device with the new value data read from the data exchange module, and writing feedback data to the data exchange module on the customer replaceable component upon completion of the update of the memory device, the feedback data providing at least a confirmation that the update of the memory device with the new value data is complete.

2. The method of claim 1, the new value data identifying a specific data location in the memory device and providing an updated value to be placed in the identified specific data location.

3. The method of claim 2, further comprising executing an authentication scheme in the operating system to determine that the new value data programed into the data exchange module is genuine.

4. The method of claim 3, the new value data programed into the data exchange module further comprising authentication data that is referenced by the authentication scheme.

5. The method of claim 1, the operating system being an image forming device, the data exchange module being a customer replaceable unit monitor module in a customer replaceable unit installed in the image forming device, and the memory device being a non-volatile memory device in the image forming device.

6. The method of claim 5, the new value data programed into the data exchange module including data values for optimizing use of the customer replaceable unit in the image forming device.

7. The method of claim 5, the new value data programmed into the data exchange module including data values that are associated with operations of the image forming device and not associated with the operation of the customer replaceable unit in the image forming device.

8. The method of claim 5, the feedback data being externally readable from the data exchange module by a remote monitoring facility to facilitate at least one of inventory management and configuration control by including at least confirmation that the update of the memory device has been implemented in the image forming device identified by at least a serial number for the image forming device.

9. An information exchange device for updating a memory unit in an operating system, comprising:

a communicating device that establishes data communication between the memory unit in the operating system and a data exchange module on a customer replaceable component when the customer replaceable component is installed in the operating system;

a reading device that detects new value data programmed into the data exchange module for updating the memory unit;

a processor that is programmed to determine that the memory unit has not been updated with the new value data and to update the memory unit with the new value data read from the data exchange module; and a writing device that writes feedback data to the data exchange module on the customer replaceable component upon completion of the update of the memory unit, the feedback data providing at least a confirmation that the update of the memory unit with the new value data is complete.

10. The information exchange device of claim 9, the new value data identifying a specific data location in the memory unit and providing an updated value to be placed in the identified specific data location.

11. The information exchange device of claim 10, further comprising an authentication unit that executes an authentication scheme to determine that the new value data programmed into the data exchange module is genuine.

12. The information exchange device of claim 11, the new value data programmed into the data exchange module further comprising authentication data that is referenced by the authentication unit.

13. The information exchange device of claim 10, the operating system being an image forming device, the data exchange module being a customer replaceable unit monitor module in a customer replaceable unit installed in the image forming device, and the memory unit being a non-volatile memory device in the image forming device.

14. The information exchange device of claim 13, the new value data programmed into the data exchange module including data values for optimizing use of the customer replaceable unit in the image forming device.

15. The information exchange device of claim 1, the new value data programmed into the data exchange module including data values that are associated with operations of the image forming device and not associated with the operation of the customer replaceable unit in the image forming device.

16. The information exchange device of claim 13, the feedback data being externally readable from the data exchange module by a remote monitoring facility to facilitate at least one of inventory management and configuration control by including at least confirmation that the update of the memory unit has been implemented in the image forming device identified by at least a serial number for the image forming device.

17. A non-transitory computer-readable medium storing instructions which, when executed by a processor, cause the processor to execute the steps of a method for updating a memory device in an operating system, the method comprising:

establishing data communication between the memory device in the operating system and a data exchange module on a customer replaceable component when the customer replaceable component is installed in the operating system;

detecting new value data programed into the data exchange module for updating the memory device;

determining that the memory device has not been updated with the new value data;

executing an authentication scheme in the operating system to determine that the new value data programmed into the data exchange module is genuine;

updating the memory device with the new value data read from the data exchange module; and writing feedback data to the data exchange module on the customer replaceable component upon completion of the update of the memory device, the feedback data providing at least a confirmation that the update of the memory device with the new value data is complete, the new value data programmed into the data exchange module identifying a specific data location in the memory device and providing an updated value to be placed in the identified specific data location, and including authentication data that is referenced by the authentication scheme.

18. The non-transitory computer readable medium of claim 17, the operating system being an image forming device, the data exchange module being a customer replaceable unit monitor module in a customer replaceable unit installed in the image forming device, and the memory device being a non-volatile memory device in the image forming device, the new value data including data values that are associated with operations of the image forming device and not associated with the operation of the customer replaceable unit in the image forming device.

19. The non-transitory computer readable medium of claim 17, the feedback data being externally readable from the data exchange module by a remote monitoring facility to facilitate at least one of inventory management and configuration control by including at least confirmation that the update of the memory device has been implemented in the image forming device identified by at least a serial number for the image forming device.

* * * * *